United States Patent
Suzuki (10) Patent No.: US 8,264,989 B2
(45) Date of Patent: Sep. 11, 2012

(54) VOIP SERVER APPARATUS AND METHOD FOR MAINTAINING SOFTWARE IN VOIP SERVER APPARATUS

(75) Inventor: Yasunori Suzuki, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 1352 days.

(21) Appl. No.: 11/926,633

(22) Filed: Oct. 29, 2007

(65) Prior Publication Data

US 2008/0101345 A1 May 1, 2008

(30) Foreign Application Priority Data

Nov. 1, 2006 (JP) ................................ 2006-297327

(51) Int. Cl.
*H04L 12/16* (2006.01)
*H04L 12/66* (2006.01)
*H04L 12/56* (2006.01)
*G06F 9/44* (2006.01)
*G06F 17/30* (2006.01)
*G06F 3/01* (2006.01)
*G06F 9/45* (2006.01)
*G06F 17/00* (2006.01)
*G06F 7/00* (2006.01)

(52) U.S. Cl. .................... 370/259; 370/395.2; 717/120; 717/122; 717/168; 717/169; 717/170; 707/638; 715/229

(58) Field of Classification Search .................. 370/352, 370/254, 259, 395.2, 359; 709/202, 220, 709/221, 222, 203, 219; 713/1, 2, 100, 222; 379/265.09; 717/120, 122, 168–178; 707/638; 715/229
See application file for complete search history.

(56) References Cited

U.S. PATENT DOCUMENTS

| 6,282,709 B1 * | 8/2001 | Reha et al. ..................... 717/175 |
| 6,445,682 B1 * | 9/2002 | Weitz ............................. 370/257 |
| 7,177,898 B2 * | 2/2007 | Nakashima ................... 709/201 |
| 7,643,435 B1 * | 1/2010 | Chang ........................... 370/259 |

(Continued)

FOREIGN PATENT DOCUMENTS

JP 9-34814 A 2/1997

(Continued)

OTHER PUBLICATIONS

Japanese Office Action issued Aug. 2, 2011 in Japanese Application No. 2006 297327.

*Primary Examiner* — Asad Nawaz
*Assistant Examiner* — Wutchung Chu
(74) *Attorney, Agent, or Firm* — Sughrue Mion, PLLC (57) ABSTRACT

Disclosed are a VoIP server apparatus and a method for maintaining VoIP server software in the server apparatus which transmits/receives a packet to/from an IP terminal via network to provide VoIP service. The method includes: assigning a virtual IP address to the server apparatus; associating a first IP address used by first VoIP server software with the virtual IP address; activating second VoIP server software while the first VoIP server software receives a packet addressed to the virtual IP address and provides VoIP service; changing the association of the virtual IP address with the first IP address to association of the virtual IP address with a second IP address used by the second VoIP server software; receiving a packet addressed to the virtual IP address by the second VoIP server software; and changing VoIP service by the first VoIP server software to VoIP service by the second VoIP server software.

12 Claims, 6 Drawing Sheets

U.S. PATENT DOCUMENTS

| | | | |
|---|---|---|---|
| 7,783,914 B1 * | 8/2010 | Havemose | 714/4.11 |
| 7,869,424 B2 * | 1/2011 | Delveaux et al. | 370/352 |
| 7,908,467 B2 * | 3/2011 | Philyaw | 713/1 |
| 2004/0015868 A1 * | 1/2004 | Dutta et al. | 717/126 |
| 2004/0015953 A1 * | 1/2004 | Vincent | 717/173 |
| 2004/0158817 A1 * | 8/2004 | Okachi et al. | 717/122 |
| 2006/0031540 A1 * | 2/2006 | Purontaus et al. | 709/229 |
| 2007/0067419 A1 * | 3/2007 | Bennett | 709/219 |
| 2007/0109984 A1 * | 5/2007 | Buchholz et al. | 370/310.2 |
| 2007/0245338 A1 * | 10/2007 | Musha | 717/173 |
| 2008/0014961 A1 * | 1/2008 | Lipps et al. | 455/456.1 |
| 2008/0195592 A1 * | 8/2008 | Kelley et al. | 707/3 |

FOREIGN PATENT DOCUMENTS

| | | |
|---|---|---|
| JP | 2000137620 A | 5/2000 |
| JP | 2004-171370 A | 6/2004 |
| JP | 2005-294966 A | 10/2005 |

* cited by examiner

VOIP SERVER SOFTWARE OPERATING PARAMETERS

|  | VOIP SERVER SOFTWARE 30 (VER. X) | VOIP SERVER SOFTWARE 32 (VER. Y) |
|---|---|---|
| IP ADDRESS | B | C |
| NETWORK INTERFACE NUMBER | NETWORK INTERFACE UNIT 60 | NETWORK INTERFACE UNIT 61 |
| REFERENCE SETTING DATA | SETTING DATA 31 | SETTING DATA 33 |

VOIP SERVER APPARATUS AND METHOD FOR MAINTAINING SOFTWARE IN VOIP SERVER APPARATUS

This application is based upon and claims the benefit of priority from Japanese patent application No. 2006-297327, filed on Nov. 1, 2006, the disclosure of which is incorporated herein in its entirety by reference.

BACKGROUND OF THE INVENTION

1. Field of the Invention

The present invention relates to a VoIP server apparatus and a method for maintaining software in a VoIP server apparatus.

2. Description of the Related Art

Figure 6:
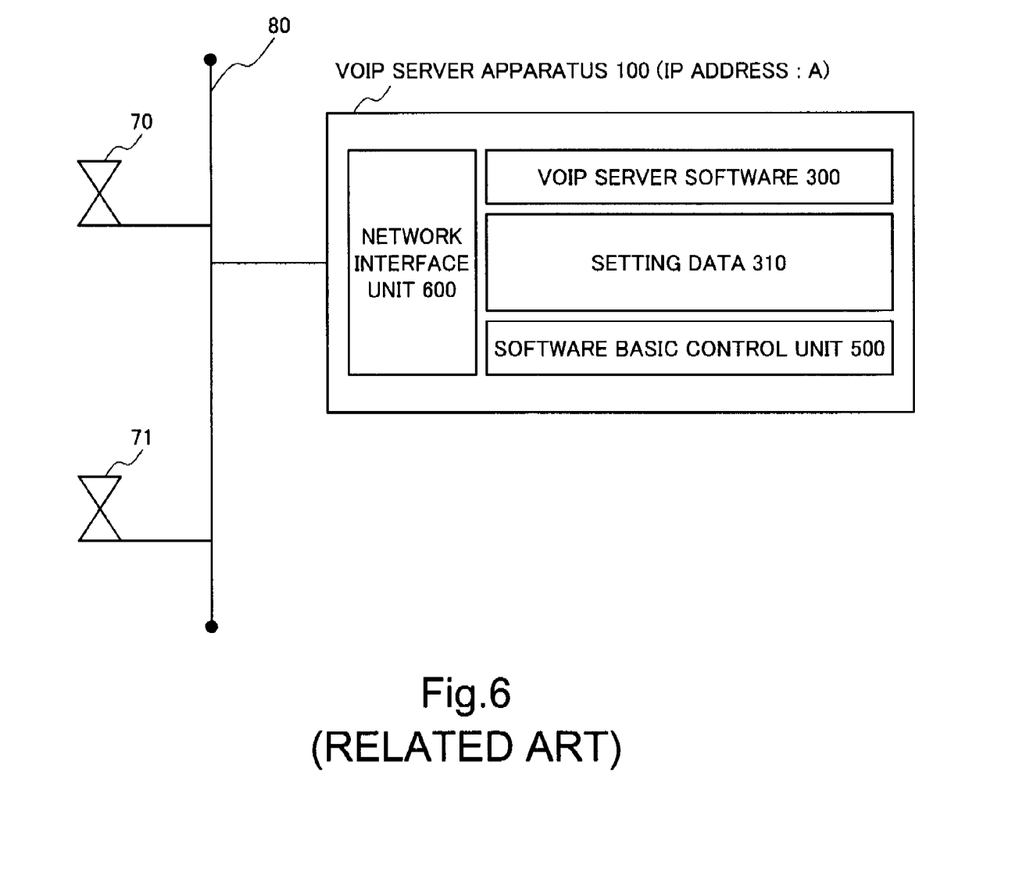
FIG. 6 is a functional block diagram showing a configuration of a VoIP server apparatus of a related art.

A related art of a VoIP (Voice over Internet Protocol) server apparatus which is an important constituent element for realizing a VoIP service will be described with reference to FIG. 6. In FIG. 6, IP terminals 70 and 71, and a VoIP server apparatus 100 are connected to a network 80. The VoIP server apparatus 100 includes a network interface unit 600, VoIP server software 300, setting data 310 and a software basic control unit 500.

The network interface unit 600 is an interface for connecting to the network 80. The VoIP server software 300 controls the IP terminals 70 and 71 to provide a VoIP service. Here, only one VoIP server software 30b can be executed as VoIP server software in the VoIP server apparatus 100. The setting data 310 is data which the VoIP server software 300 uses. The software basic control unit 500 operates with VoIP server software 300 to realize a function of the VoIP server software 300. The software basic control unit 500 may be realized by software, for example. Here, an IP (Internet Protocol) address of the VoIP server apparatus 100 is set as "A".

In the VoIP server apparatus 100, because the software basic control unit 500 is closely associated with the VoIP server software 300, they operate in an integrated manner substantially. Therefore, when different VoIP server software is installed, two pieces of VoIP server software cannot operate at the same time. Accordingly, when a software update to improve a service, such as adding new functions, is performed, a VoIP service is interrupted and then the VoIP server software 300 is updated.

Japanese Patent Application Laid-Open No. 2004-171370 (hereinafter, referred to as patent document 1) discloses a technology in which server apparatuses or information processing units include a duplicated configuration having an active part and a reserve (standby) part in order to prevent service interruption. A similar technology is disclosed by Japanese Patent Application Laid-Open No. Hei 09(1997)-34814 (hereinafter, referred to as patent document 2).

SUMMARY OF THE INVENTION

An exemplary object of the present invention is to provide a VoIP server apparatus and a method for maintaining software in a VoIP server apparatus which enable to minimize a service interruption time at the time of maintenance such as a software update.

A method for maintaining VoIP server software in a VoIP server apparatus which transmits/receives a packet to/from an IP terminal via a network to provide a VoIP service according to an exemplary aspect of the invention includes: assigning a virtual IP address to the VoIP server apparatus; associating a first IP address used by first VoIP server software with the virtual IP address; activating second VoIP server software while the first VoIP server software receives a packet addressed to the virtual IP address and provides a VoIP service; changing the association of the virtual IP address with the first IP address to association of the virtual IP address with a second IP address used by the second VoIP server software; receiving a packet addressed to the virtual IP address by the second VoIP server software; and changing a VoIP service by the first VoIP server software to a VoIP service by the second VoIP server software.

A VoIP server apparatus which includes a virtual IP address, transmits/receives a packet to/from an IP terminal via a network and provides a VoIP service according to an exemplary aspect of the invention includes: first VoIP server software which transmits and receives a packet using a first IP address by a first network interface unit; second VoIP server software which transmits and receives a packet using a second IP address by a second network interface unit; and an IP change control unit which changes between association with the virtual IP address and the first IP address and association with a virtual IP address and the second IP address, wherein the second VoIP server software is activated while the first VoIP server software provides a VoIP service by associating the first IP address with the virtual IP address; and wherein the IP change control unit changes association of the virtual IP address with the first IP address to the second IP address and changes a VoIP service by the first VoIP server software to a VoIP service by the second VoIP server software.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

Figure 1:
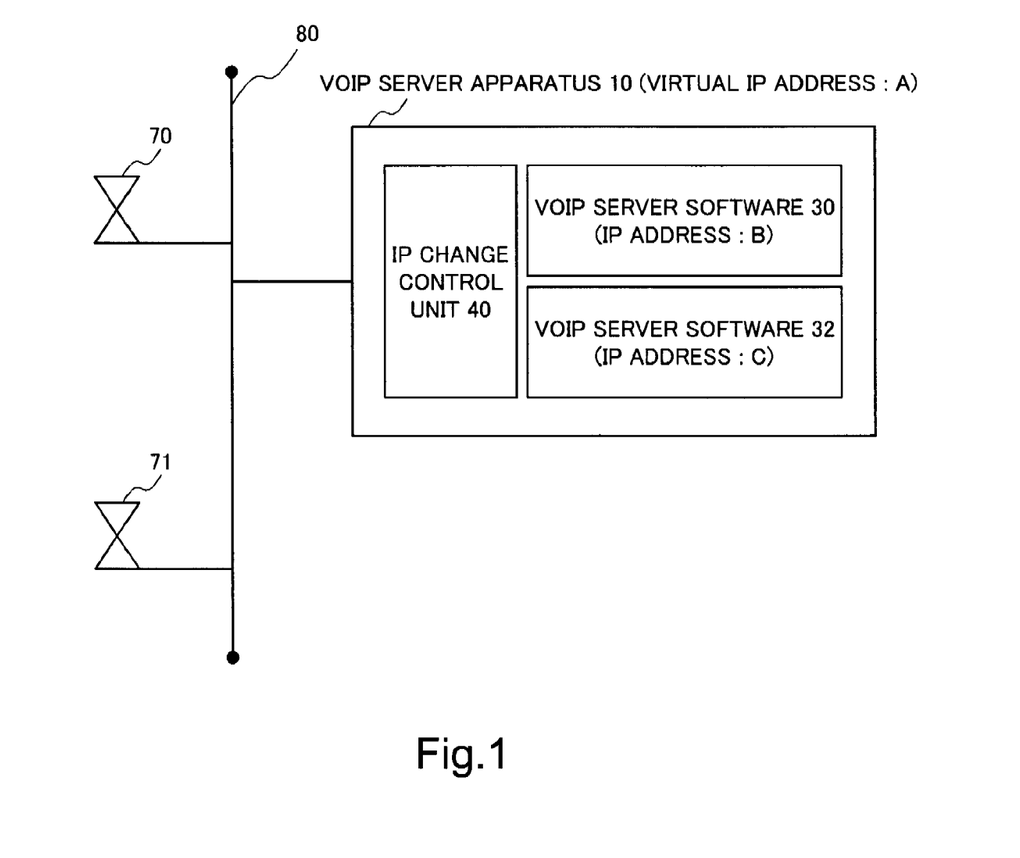
FIG. 1 is a functional block diagram showing an outline of a first exemplary embodiment.

First, a principle and an outline of an exemplary embodiment will be described with reference to FIG. 1. FIG. 1 is a functional block diagram showing an outline of a first exemplary embodiment. In FIG. 1, IP terminals 70 and 71 provide a VoIP service according to a control of a VoIP server apparatus 10. The VoIP server apparatus 10 includes a virtual IP address "A". In the VoIP server apparatus 10, first VoIP server software 30 and second VoIP server software 32 can be executed simultaneously. The VoIP server software 32 is basically the same as the VoIP server software 30. However, a version of the VoIP server software 32 is different from that of the VoIP server software 30 because functions of both software 30 and 32 are different from each other. Now, suppose, for example, that the first VoIP server software 30 corresponds to a current version (Version X) and the second VoIP server software 32 corresponds to an updated version (Version Y).

Parameters required for executing the VoIP server software 30 and 32 are designated, respectively. The parameters include an IP address for the time of a program execution. An IP address "B" is set in the VoIP server software 30. At the time of normal operation of the VoIP server apparatus 10, an IP change control unit 40 associates the IP address "B" with the virtual alias IP address "A". As a result, the VoIP server apparatus 10 can receive an IP packet from outside whose destination address is set to the virtual IP address "A".

That is, the virtual IP address "A" is associated with the IP address "B" by the IP change control unit 40. Accordingly, the VoIP server software 30 can receive an IP packet transmitted from the IP terminals to the virtual IP address "A". Therefore, the IP terminals usually provides a VoIP service according to a control of the VoIP server software 30.

Now, suppose that VoIP server software 32 with a new version is provided and updating (i.e. maintenance) of software becomes necessary. The VoIP server software 32 is software with a new version in which a new service function is added to the VoIP server software 30. At the time, first, different parameters including an IP address "C" are given to the VoIP server software 32 to activate a program. However, at this time, the IP change control unit 40 still associates the IP address "B" of the VoIP server software 30 with the virtual IP address "A" of the VoIP server apparatus 10. Therefore, at this stage, IP packets from the IP terminals do not reach the VoIP server software 32 with the IP address "C".

Here, the IP change control unit 40 deletes association between the virtual IP address "A" and the IP address "B" and associates the virtual IP address "A" with the IP address "C". When association between the addresses is changed, an IP packet transmitted from the IP terminals to the virtual IP address "A" reaches the VoIP server software 32. Thus, a new added service provided by the VoIP server software 32 becomes available. Then, in the VoIP server apparatus 10, it is not needed to turn off and turn on a power supply of hardware. Therefore, a service is interrupted only during a period of time for changing association between IP addresses, and therefore software updating can be performed for a very short time.

Figure 2:
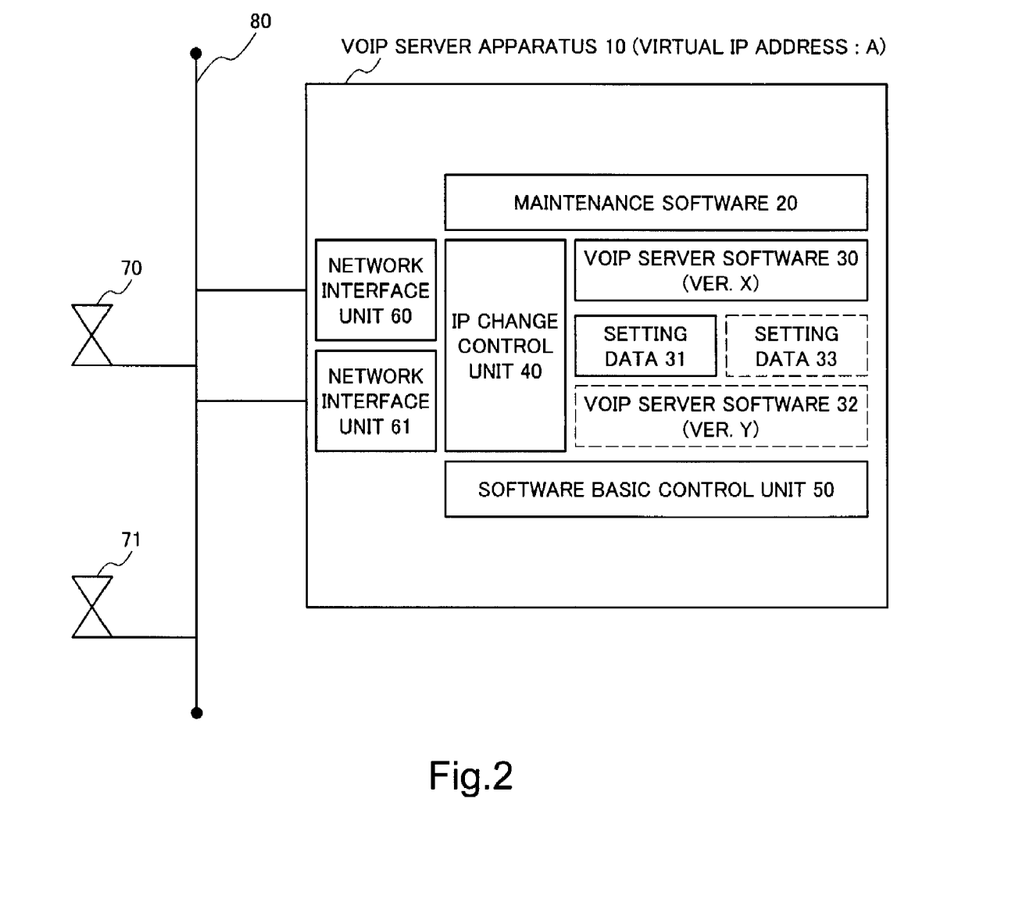
FIG. 2 is a functional block diagram showing a detailed configuration of the first exemplary embodiment.

Next, a detailed configuration of the first exemplary embodiment will be described with reference to a drawing. A detailed configuration of the VoIP server apparatus 10 according to the first exemplary embodiment is shown in FIG. 2. In FIG. 2, the VoIP server apparatus 10 includes maintenance software 20, first VoIP server software 30, first setting data 31, second VoIP server software 32, second setting data 33, an IP change control unit 40, a software basic control unit 50, a first network interface unit 60 and a second network interface unit 61. The VoIP server apparatus 10 and IP terminals 70 and 71 are connected to the network 80.

The first VoIP server software 30, the second VoIP server software 32 and the IP change control unit 40 in the VoIP server apparatus 10 shown in FIG. 2 can be applied to above descriptions regarding FIG. 1.

The first VoIP server software 30 operates by referring to the first setting data 31. Similarly, the second VoIP server software 32 operates by referring to the second setting data 33. The second setting data 33 is a copy of the first setting data 31. A content of the first setting data 31 is equal to that of the second setting data 33, but the both data are provided as different data files.

The network interface units 60 and 61 are interfaces for connecting with the network 80. The network interface units 60 and 61 are assigned to VoIP server software 30 and 32, respectively.

The maintenance software 20 is software which is used for changing or activating software and for setting or changing various parameters. The software basic control unit 50 enables an operation of a plurality of programs in the VoIP server apparatus 10. The software basic control unit 50 can be realized by for example, basic software such as an operating system. For example, the IP change control unit 40 can be realized by software. Then, the maintenance software 20, the VoIP server software 30 and 32, and the IP change control unit 40 can simultaneously operate on the operating system (i.e. the software basic control unit 50). The VoIP server apparatus 10 and the IP terminals 70 and 71 transmit and receive a control signal through the network 80.

Figure 3:
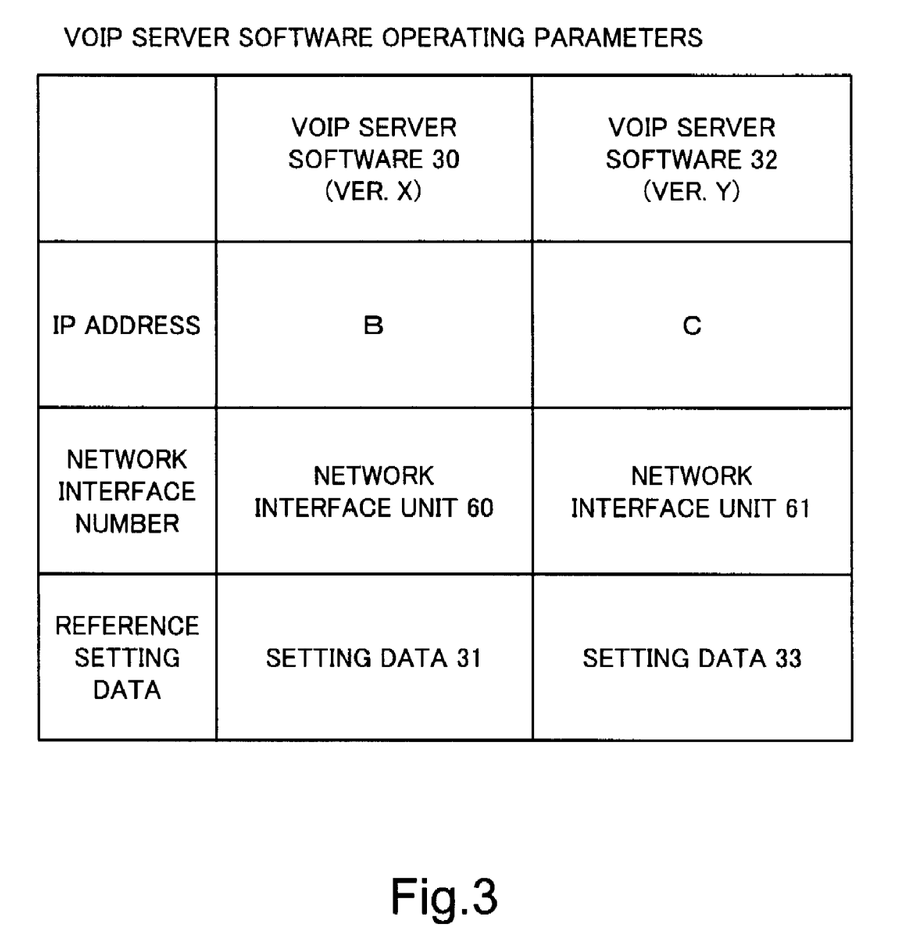
FIG. 3 is a figure showing an example of operating parameters for VoIP server software in the first exemplary embodiment.

FIG. 3 shows an example of operation parameters of VoIP server software in the first exemplary embodiment. Operation parameters for the VoIP server software 30 are designated as shown in FIG. 3. That is, an IP address is set to "B", the network interface unit 60 is assigned as a network interface, and the setting data 31 is designated as a reference setting data. That is, in the IP change control unit 40, the IP address "B" designated for the VoIP server software 30 is associated with the network interface unit 60. The VoIP server apparatus 10 includes a virtual IP address "A" that is used for transmitting/receiving a control signal to/from the IP terminals 70 and 71. That is, in the IP change control unit 40, the virtual IP address "A" is additionally assigned to a MAC (Media Access Control) address of the network interface unit 60. Accordingly, when the IP terminals 70 and 71 designate the virtual IP address "A" as a destination address, an IP packet reaches the VoIP server apparatus 10, and the IP packet can be received by the VoIP server software 30.

Similarly, as to the VoIP server software 32, an IP address "C" is set, the network interface unit 61 is assigned as a network interface, and the setting data 33 is designated as a reference setting data.

In the IP terminals 70 and 71, a destination address of a control signal is set to only the virtual IP address "A". At the time of a normal operation, in the VoIP server apparatus 10, the VoIP server software 30 operates, and the VoIP server software 32 is not executed. At that time, the IP terminals 70 and 71 transmit a control signal to the virtual IP address "A" which is a destination address of the control signal. The transmitted control signal is received by the VoIP server software 30 with an operation of the IP change control unit 40. The VoIP server apparatus 10 provides a VoIP service by transmitting/receiving a control signal to/from the IP terminals 70 and 71.

Figure 4:
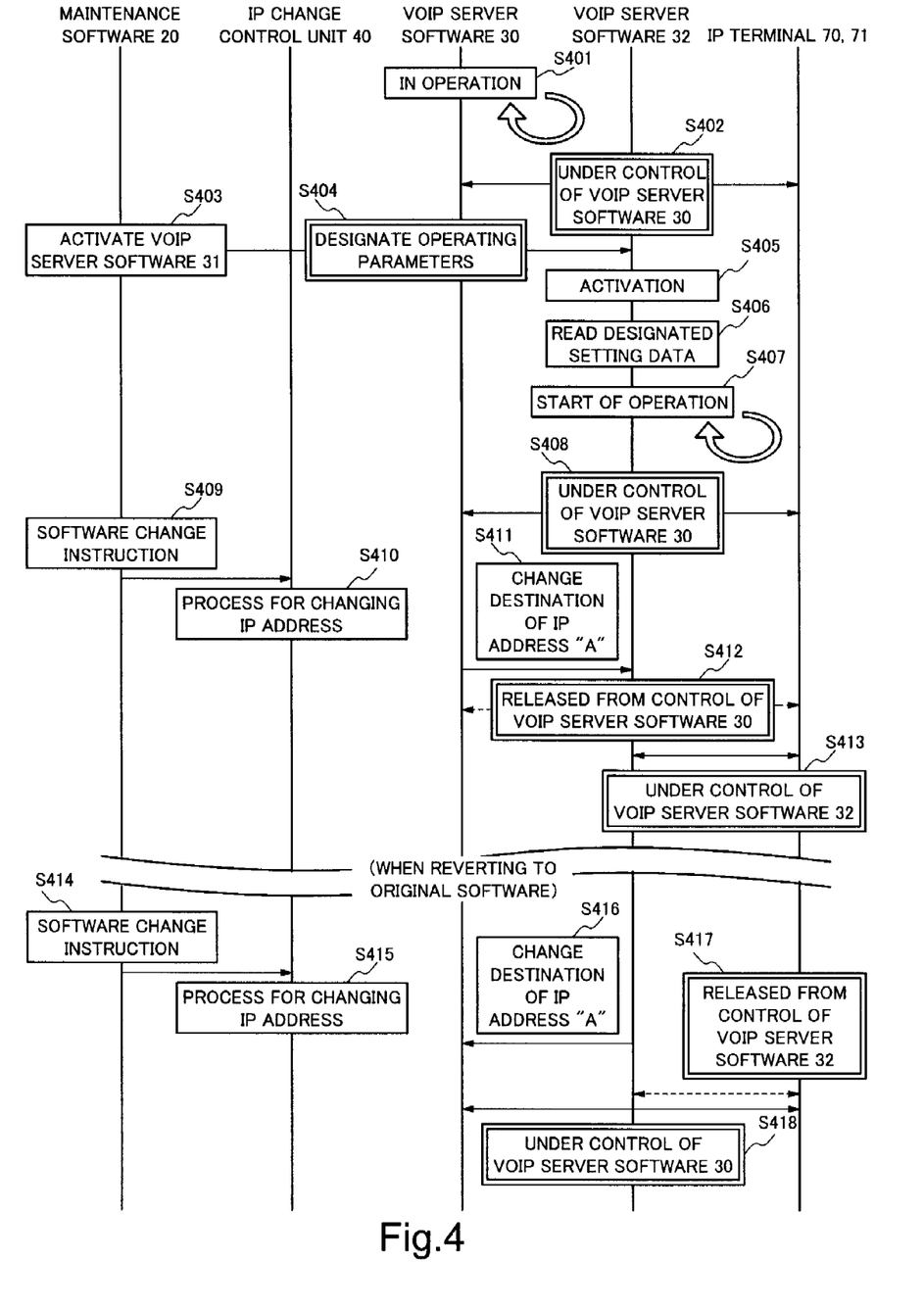
FIG. 4 is a figure illustrating an operation flow of the first exemplary embodiment.

Next, an operation of the first exemplary embodiment will be described with reference to a drawing. FIG. 4 is a figure illustrating a flow of an operation of the first exemplary embodiment. By referring to FIG. 4, an operation of a VoIP server apparatus 10 will be described.

First, as mentioned above, in the VoIP server apparatus 10 of a normal state, the first VoIP server software 30 (Version X) is in an operation state (step S401). In this state, the IP terminals 70 and 71 operate under a control of the VoIP server software 30 and a VoIP service is provided (step S402).

Here, it is considered that a software update from the VoIP server software 30 to the VoIP server software 32 (Version Y) having a new function is executed. First, the VoIP server software 32 is activated by using the maintenance software 20 in a maintenance console or the like (not shown) (step S403). When activating the VoIP server software 32, operating parameters are designated by using the maintenance software 20 (step S404). By this operation, the VoIP server software 32 is activated according to the designated operating parameters (step S405), and a designated setting data 33 is read (step S406) Here, the VoIP server software 32 starts to operate and becomes a standby state (step S407).

In a state in which the VoIP server software 32 activates, VoIP server software 30 and 32 operate simultaneously in the VoIP server apparatus 10. However, the IP terminals 70 and 71 are still controlled by the VoIP server software 30 (step S408). Here, a software change instruction is performed by using the maintenance software 20 at the timing when changing from the first VoIP server software 30 to the second VoIP server software 32 is carried out (Step S409).

An IP address change instruction to the IP change control unit 40 is included in the software change instruction in step S409. Upon reception of the instruction, the IP change control unit 40 performs an IP address change process (step S410). Here, the network interface unit 60 assigned to the first VoIP server software 30 is changed to the network interface unit 61 assigned to the second VoIP server software 32 with respect to association with the virtual IP address "A" of the VoIP server apparatus 10.

Actually, the IP address "B" is assigned to the network interface unit 60. At first, the virtual IP address "A" is given as another name (alias) of the IP address "B". At the time of an IP address change, this alias is eliminated and the virtual IP address "A" is given as an alias of the IP address "C" that is assigned to the network interface unit 61. As a result, association on the virtual IP address "A" is changed and the network interface unit 61 can receive an IP packet addressed to the virtual IP address "A" (step S411).

That is, in the IP change control unit 40, the IP address "C" designated for the VoIP server software 32 is associated with the network interface unit 61. Moreover, the virtual IP address "A" is additionally assigned to a MAC address of the network interface unit 61. As a result, an IP packet addressed to the virtual IP address "A" is transmitted to the IP address "C" that is assigned to the network interface unit 61 and the IP packet can be processed by the VoIP server software 32. As a result, an apparatus according to the first exemplary embodiment can obtain the same effect as that of updating a VoIP server software from a current version (Version X) to a new version (Version Y).

Because a destination address of a control signal, that is the IP address "A", is not changed, the IP terminals 70 and 71 do not need to know which software operates, a new one or an old one. However, based on a process for changing IP address (step S410), actually, the IP terminals 70 and 71 withdraw from the control of the first VoIP server software 30 (step S412) and operate under a control of the second VoIP server software 32 (step S413).

As mentioned above, an operation for updating (changing) VoIP server software to a new version thereof is performed. Additionally, when an operation failure, a data setting error or the like is found after updating the VoIP server software 32, it is necessary that the updated VoIP server software 32 reverts to the VoIP server software 30 (old version). In such case, first, a change of software is instructed again via the maintenance software 20 (step S414). Thereby, the IP change control unit 40 performs a process for changing IP address again (step S415). That is, association of which the virtual IP address "A" of the VoIP server apparatus 10 is assigned to the network interface unit 61 (the IP address "C") is deleted and the virtual IP address "A" is given as an alias of the IP address "B" of the network interface unit 60.

As a result, a destination of the IP packet from the IP terminals 70 and 71 is changed to the VoIP server software 30 from the VoIP server software 32 (step S416). As a result, the IP terminals 70 and 71 are released from the control of the VoIP server software 32 (step S417), and operate under a control of the VoIP server software 30 (step S418). Thus, it is easy to revert to an old version of VoIP server software from a new version thereof.

In the above mentioned exemplary embodiment, addition or change of the setting data 31 may be required at the same time, when the current VoIP server software 30 is updated. Even such case, it is enough to only set the second setting data 33 to contents to be added or changed, in advance. As a result, when the VoIP server software 30 is updated, at the same time, contents of the setting data is updated to a new content. Therefore, the update can be performed without service interruption.

Further, when an update of a setting data is not needed, setting data 31 can be used in common by the VoIP server software 30 (old version) and the VoIP server software 32 (new version).

Figure 5:
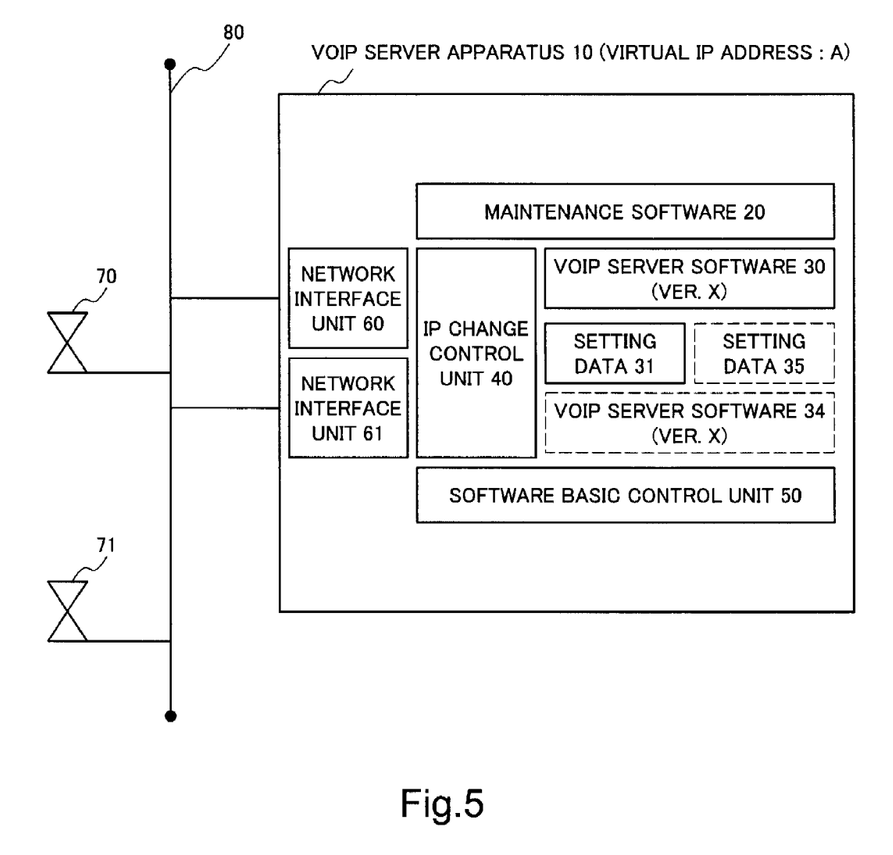
FIG. 5 is a functional block diagram showing a detailed configuration of a second exemplary embodiment.

Next, a second exemplary embodiment will be described with reference to a drawing. FIG. 5 is a functional block diagram showing a configuration of the second exemplary embodiment. The basic configuration is the same as that of the first exemplary embodiment shown in FIG. 2. However, the second exemplary embodiment describes another example in which a combination of VoIP server software and setting data is different from that of the first exemplary embodiment shown in FIG. 2. In FIG. 5A, the VoIP server apparatus 10 includes VoIP server software 34 instead of the VoIP server software 32 shown in FIG. 2, and includes setting data 35 instead of the setting data 33 shown in FIG. 2. An IP address "C", a network interface unit 61 and reference setting data 35 are assigned as an operating parameter of the VoIP server software 34.

Here, a version of the VoIP server software 34 is the same as that of the VoIP server software 30 (Version X). Accordingly, the software 30 and 34 include the same function. In the configuration, when contents of the setting data 31 used by the VoIP server software 30 is completely different from contents of the setting data 35 used by the VoIP server software 34, services contents actually provided are different. For example, services which the IP terminals 70 and 71 may use are different, or extension numbers or the like of the IP terminals 70 and 71 are different. Therefore, the VoIP server software 30 and the VoIP server software 34 operate in a VoIP server apparatus 10 in quite different environments respectively.

Accordingly, when VoIP server software is changed by using the maintenance software 20 according to procedures in descriptions on FIG. 4, environments such as a service to be provided or an extension number can be changed immediately.

A third exemplary embodiment of the invention is the method for maintaining a VoIP server software in a VoIP server apparatus wherein a version of the second VoIP server software is newer than a version of the first VoIP server software.

Furthermore, a forth exemplary embodiment of the invention is the method for maintaining a VoIP server software in a VoIP server apparatus wherein the first VoIP server software uses first setting data, and the second VoIP server software uses second setting data.

Furthermore, a fifth exemplary embodiment of the invention is the method for maintaining a VoIP server software in a VoIP server apparatus wherein a setting content of the first setting data is the same as a setting content of the second setting data.

Furthermore, a sixth exemplary embodiment of the invention is the method for maintaining a VoIP server software in a VoIP server apparatus wherein a setting content of the first setting data is different from a setting content of the second setting data.

Furthermore a seventh exemplary embodiment of the invention is the method for maintaining a VoIP server software in a VoIP server apparatus wherein a version of the first VoIP server software is the same as a version of the second VoIP server software; and a setting content of first setting data used by the first VoIP server software is different from a setting content of second setting data used by the second VoIP server software.

Furthermore, an eighth exemplary embodiment of the invention is the method for maintaining a VoIP server software in a VoIP server apparatus further including: after changing a VoIP service by the first VoIP server software to a VoIP service by the second VoIP server software, changing association of the virtual IP address with the second IP address to the first IP address; and changing a VoIP service by the second VoIP server software to a VoIP service by the first VoIP server software again.

Furthermore, a ninth exemplary embodiment of the invention is the VoIP server apparatus wherein a version of the second VoIP server software is newer than a version of the first VoIP server software.

Furthermore, a tenth exemplary embodiment of the invention is the VoIP server apparatus wherein the first VoIP server software uses first setting data, and the second VoIP server software uses second setting data.

Furthermore, an eleventh exemplary embodiment of the invention is the VoIP server apparatus wherein a setting content of the first setting data is the same as a setting content of the second setting data.

Furthermore, a twelfth exemplary embodiment of the invention is the VoIP server apparatus wherein a setting content of the first setting data is different from a setting content of the second setting data.

Furthermore, a thirteenth exemplary embodiment of the invention is the VoIP server apparatus wherein a version of the first VoIP server software is the same as a version of the second VoIP server software; and a setting content of the first setting data used by the first VoIP server software is different from a setting content of the second setting data used by the second VoIP server software.

Furthermore, a fourteenth exemplary embodiment of the invention is the VoIP server apparatus wherein after changing of a VoIP service by the first VoIP server software to a VoIP service by the second VoIP server software, association of the virtual IP address with the second IP address is changed to the first IP address; and wherein a VoIP service by the second VoIP server software is changed to a VoIP service by the first VoIP server software again.

In a VoIP server apparatus 100 of a related art shown in FIG. 6, when VoIP server software 300 is updated, an operation of the VoIP server apparatus 100 has to be stopped until completion of installation of new software from start of a software update work. Thus, a service interruption time becomes long.

When problems exist in updated software, an interruption time has also been needed for reverting to an old version of software. Moreover, when a difference between setting data for new version of software and setting data for an old version thereof exists, a work to revert to the setting data for the old version software is also necessary.

Moreover, a working time required for updating the VoIP server software 300 may include a time for turning off a power supply of hardware and a time for turning on it again. Then, a service interruption time includes a time required for activating new software and further increase of a service interruption time occurs. Therefore, an update work of the VoIP server software 300 has to be performed in a time zone in which a number of service users and a traffic amount are small. Even when adding a function, a long time is required for providing a service again. When a data setting is newly required for a new service, all services cannot be started until a completion of data setting from start of an operation of new software. In the VoIP server apparatus 100, it is impossible to newly add a setting data 310 before updating software and a service cannot be provided until a data setting is completed even when the software is updated. In case of an example shown in FIG. 6, because the setting data 310 exists alone, a data update can not be performed before updating software.

Further, technology described in the above-mentioned patent document 1 is a technology for switching between two server apparatuses, a primary server apparatus and a standby server apparatus, which are physically different from each other. The technology differs from a technology for a software maintenance method in which a switching is performed in one server apparatus as disclosed by the present invention from the point of view of a problem and a method to solve the problem. Such situation is also similar with respect to a technology described in the above-mentioned patent document 2.

Moreover, in the technology described in the patent document 1, because two server apparatuses use one IP address in common, a switching between two server apparatuses, a primary server apparatus and a standby server apparatus, is performed by a physical operation. That is, LAN interface units of the two server apparatuses requires a special configuration in which the two LAN interface units have the same MAC address each other. In the present invention, such special interface configuration is not required.

An exemplary advantage according to the invention is to be able to minimize a service interruption time when maintenance such as a software update of a VoIP server apparatus is performed. That is, a virtual IP address is set to a VoIP server apparatus, and association between an IP address used by VoIP server software to be operated and the virtual IP address is changed in an inside of the apparatus. By the change, software which provides a VoIP service is selected. Accordingly, the above-mentioned advantage can be obtained.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A method for maintaining VoIP server software in a VoIP server apparatus which transmits/receives a packet to/from an IP terminal via a network to provide a VoIP service, the method comprising:
    assigning a virtual IP address to the VoIP server apparatus;
    associating a first IP address used by first VoIP server software with the virtual IP address;
    activating second VoIP server software while the first VoIP server software receives a packet addressed to the virtual IP address and provides a VoIP service;

changing the association of the virtual IP address with the first IP address to association of the virtual IP address with a second IP address used by the second VoIP server software;

receiving a packet addressed to the virtual IP address by the second VoIP server software;

changing a VoIP service by the first server software to a VoIP service by the second VoIP server software; and wherein a version of the second VoIP server software is newer than a version of the first VoIP server software.

2. The method for maintaining a VoIP server software in a VoIP server apparatus according to claim 1, wherein the first VoIP server software uses first setting data, and the second VoIP server software uses second setting data.

3. The method for maintaining a VoIP server software in a VoIP server apparatus according to claim 2, wherein a setting content of the first setting data is the same as a setting content of the second setting data.

4. The method for maintaining a VoIP server software in a VoIP server apparatus according to claim 2, wherein a setting content of the first setting data is different from a setting content of the second setting data.

5. The method for maintaining a VoIP server software in a VoIP server apparatus according to claim 1, wherein
  a version of the first VoIP server software is the same as a version of the second VoIP server software; and
  a setting content of first setting data used by the first VoIP server software is different from a setting content of second setting data used by the second VoIP server software.

6. The method for maintaining a VoIP server software in a VoIP server apparatus according to claim 1, further comprising:
  after changing a VoIP service by the first VoIP server software to a VoIP service by the second VoIP server software, changing association of the virtual IP address with the second IP address to the first IP address; and
  changing a VoIP service by the second VoIP server software to a VoIP service by the first VoIP server software again.

7. A VoIP server apparatus which includes a virtual IP address, transmits/receives a packet to/from an IP terminal via a network and provides a VoIP service, comprising:
  first VoIP server software which transmits and receives a packet using a first IP address by a first network interface unit;
  second VoIP server software which transmits and receives a packet using a second IP address by a second network interface unit; and
  an IP change control unit which changes between association with the virtual IP address and the first IP address and association with a virtual IP address and the second IP address,
  wherein the second VoIP server software is activated while the first VoIP server software provides a VoIP service by associating the first IP address with the virtual IP address;
  wherein the IP change control unit changes association of the virtual IP address with the first IP address to the second IP address and changes a VoIP service by the first VoIP server software to a VoIP service by the second VoIP server software; and
  wherein a version of the second VoIP server software is newer than a version of the first VoIP server software.

8. The VoIP server apparatus according to claim 7, wherein the first VoIP server software uses first setting data, and the second VoIP server software uses second setting data.

9. The VoIP server apparatus according to claim 8, wherein a setting content of the first setting data is the same as a setting content of the second setting data.

10. The VoIP server apparatus according to claim 8, wherein a setting content of the first setting data is different from a setting content of the second setting data.

11. The VoIP server apparatus according to claim 7, wherein
  a version of the first VoIP server software is the same as a version of the second VoIP server software; and
  a setting content of the first setting data used by the first VoIP server software is different from a setting content of the second setting data used by the second VoIP server software.

12. The VoIP server apparatus according to claim 7,
  wherein after changing of a VoIP service by the first VoIP server software to a VoIP service by the second VoIP server software, association of the virtual IP address with the second IP address is changed to the first IP address; and
  wherein a VoIP service by the second VoIP server software is changed to a VoIP service by the first VoIP server software again.

* * * * *